United States Patent [19]

Schievelbein et al.

[11] 3,847,764

[45] Nov. 12, 1974

[54] SECONDARY RECOVERY PROCESS UTILIZING BRINE ELECTROLYZED TO REMOVE HYDROGEN SULFIDE

[75] Inventors: Vernon H. Schievelbein; Leonard A. Shankle, both of Houston, Tex.; Herbert N. Wade, Riverside, Conn.

[73] Assignee: Texaco Inc., New York, N.Y.

[22] Filed: June 11, 1973

[21] Appl. No.: 368,809

Related U.S. Application Data

[62] Division of Ser. No. 216,190, Jan. 7, 1972, Pat. No. 3,789,586.

[52] U.S. Cl. ................................. 204/149, 204/130
[51] Int. Cl. .............................................. C02c 5/12
[58] Field of Search ............................ 204/149, 130

[56] References Cited
UNITED STATES PATENTS 3,250,692   5/1966   Hass et al. ........................ 204/130
3,647,653   3/1972   Carlson ............................. 204/130

Primary Examiner—John H. Mack
Assistant Examiner—A. C. Prescott
Attorney, Agent, or Firm—Thomas H. Whaley; C. G. Ries

[57] ABSTRACT

A process for the recovery of liquid hydrocarbons in which brine is injected into the formation via an injection well and a mixture of liquid hydrocarbons together with brine contaminated with hydrogen sulfide is recovered through a production well. After separation of the liquid hydrocarbons, the brine is subjected to electrolysis to form sodium hypochlorite which reacts with the hydrogen sulfide to yield brine having a substantially reduced hydrogen sulfide content suitable for reinjection into the formation.

1 Claim, 2 Drawing Figures

SECONDARY RECOVERY PROCESS UTILIZING BRINE ELECTROLYZED TO REMOVE HYDROGEN SULFIDE

This is a division, of application Ser. No. 216,190, filed Jan. 7, 1972 now U.S. Pat. No. 3,789,586.

BACKGROUND OF THE INVENTION

1. Field of the Invention

This invention relates to the secondary recovery of liquid hydrocarbons from subterranean formations. In particular, this invention relates to a water flooding process in which brine recovered with the oil is electrolyzed to reduce the hydrogen sulfide content thereof.

2. Description of the Prior Art

The presence of hydrogen sulfide in brine which must be handled in the course of a variety of oil-field and refinery operations often gives rise to costly and serious problems. Such water is extremely corrosive to metal equipment and when exposed to air, hydrogen sulfide liberated from the sour brine may pollute the air to the extent that damage to equipment and building may occur and may be incompatible with plant and animal life.

Many of the processes which have been developed and operated commercially for removal or hydrogen sulfide from sour brines have often resulted in pollution of the air. These include aeration of water where large quantities of hydrogen sulfide are allowed to escape into the air; bubbling exhaust gas through the sour brine water (stripping) and allowing hydrogen sulfide to escape into the air with the exhaust gas; bubbling air through sour brine, trapping the air containing the hydrogen sulfide and burning to odorless but just as hazardous sulfur dioxide; stripping with hydrocarbon gas or gases and burning to sulfur dioxide in air, etc. All of these procedures can be employed to effectively remove hydrogen sulfide from sour brine but in each instance substantial air pollution results.

Stripping of hydrogen sulfide from brine without pollution of air is possible is an inert gas such as natural gas or nitrogen is utilized as a stripping gas and the hydrogen sulfide removed is recovered from the stripping gas by physical or chemical processes known to the natural gas industry (i.e., MEA (monoethanolamine), DEA (diethanolamine), Giammarco, Vetrocoke, Thylox, Ferox, and Manchester processes or by using sodium carbonate, sodium hydroxide, lime or iron solutions. Although these procedures are very effective for removal of the hydrogen sulfide in such a way that no air pollution results, the chemicals, equipment and operating costs are very high with the result that they are not always economically feasible.

It is possible through the addition of chemicals to sour brine to control the hydrogen sulfide content thereof to some degree. For example, the addition of sufficient caustic to maintain the pH of the brine at 8.5 or higher will prevent the escape of hydrogen sulfide but the cost of such an operation is generally prohibitive because of the quantity of caustic required. Chlorine or sulfur dioxide may also be used for hydrogen sulfide control but these gases are expensive, dangerous and difficult to handle.

There is need in the art, therefore, for an efficient, economical process for removal of hydrogen sulfide from brine in which pollution of the atmosphere with the undesirable hydrogen sulfide and associated off-gases is avoided.

SUMMARY OF THE INVENTION

In its broadest aspect, this invention relates to a process for treating hydrogen sulfide contaminated sour brine by electrolysis to form sodium hypochlorite whereby reaction with the hydrogen sulfide yields brine with a reduced sulfide content. In another aspect, this invention relates to a secondary recovery process wherein hydrogen sulfide containing brine produced simultaneously with the oil is treated as described above to reduce the hydrogen sulfide concentration and the thus-treated brine is reinjected into the formation.

DETAILED DESCRIPTION OF THE INVENTION

The process of this invention in which fluid hydrocarbons are recovered from a subterranean formation penetrated by an injection well and a production well, comprises:

a. injecting brine into said formation through the injection well,
b. forcing the said brine toward said production well,
c. withdrawing a mixture of the liquid hydrocarbon and brine containing hydrogen sulfide from said production well,
d. separating said liquid hydrocarbon from the hydrogen sulfide containing brine,
e. subjecting the hydrogen sulfide containing brine to electrolysis to form sodium hypochlorite whereby reaction with the said hydrogen sulfide yields brine with a substantially reduced hydrogen sulfide content,
f. separating insolubles from the treated brine, and
g. reinjecting the thus-treated brine into the said injection well.

Figure 1:
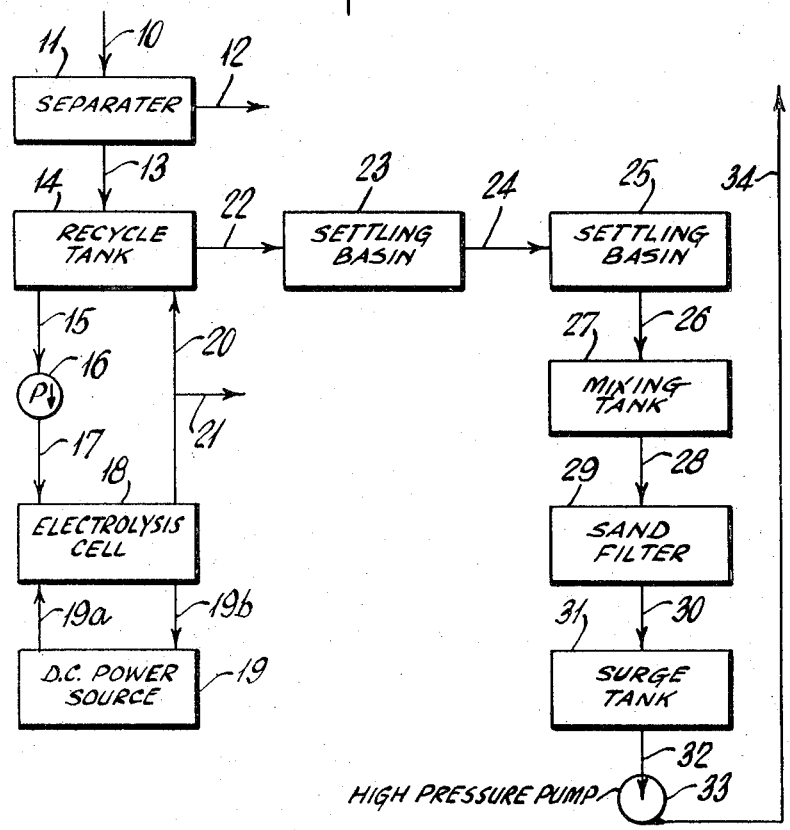

For a more complete understanding of the process, reference is made to FIG. 1 which depicts one embodiment of the invention.

A mixture of sour brine and oil, ie.e., contaminated with hydrogen sulfide from a production well in an oil field being produced by a secondary recovery process utilizing a water flood enters the treatment system via line 10 and is passed to oil separator 11, which can be a decanter or a decanter followed by an oil skimming device, from which oil is removed by means of line 12 and is sent to storage as production oil. Leaving separator 11 the sour brine passes by means of line 13 to enclosed recycle tank 14. Sour brine is withdrawn from recycle tank 14 by means of line 15 and transmitted by means of pump 16 into a closed electrolysis cell 18 via line 17. Direct current power source 19 is connected to the electrodes of electrolysis cell 18 by means of conductors 19a and 19b. Any of a number of hypochlorite cells known in the art may be utilized in the electrolysis cell section of this process. Treated brine containing (1) electrolysis products including sodium hydroxide, chlorine and hydrogen, (2) sodium hypochlorite formed in the cell by reaction of chlorine and sodium hydroxide and (3) sulfur and sulfate ions (usually as sodium sulfate) formed by reaction of sodium hypochlorite and hydrogen sulfide, together with unreacted hydrogen sulfide are withdrawn from the electrolysis cell 18 and passed to recycle tank 14 by means of line 20. Hydrogen off-gas from the formation of the sodium hydroxide in the cell is vented from line 20 to an appropriate disposal system via line 21. Treated brine from recycle tank 14 is sent by means of line 22 to settling basin 23 and then via line 24 to second settling basin 25. In settling tanks 23 and 25 solid materials, such as sulfur and any other insolubles present in the brine are permitted to settle out of the treated brine. From basin 25 the treated brine is conducted to agitated mixing tank 27 by line 26. Alum as a flocculent is added to the brine in mixing tank 27. Treated brine is withdrawn via line 28 and sent to sand filter 29 for removal of remaining suspended solids. Discharged treated brine from sand filter 29 is passed by line 30 to surge tank 31 and then into the inlet side of high pressure pump 33 via line 32. Output from high pressure pump 33 is conducted via line 34 to the injection wells in the field for reinjection to the producing formation.

During the electrolysis step at the anode chlorine will be produced:

$$2 Cl^- \rightarrow Cl_2 + 2e^- \qquad (1)$$

and at the cathode, hydroxide ions will form:

$$2e^- + 2 H_2O \rightarrow H_2 + 2 OH^- \qquad (2)$$

In the hypochlorite cell utilized, the brine flows through the electrodes at such a rate that the electrolysis products are comingled as they are rapidly swept away from the electrodes and under these conditions the chlorine generated will combine with the hydroxide according to the reaction:

$$Cl_2 + 2OH^- \rightarrow Cl^- + ClO^- + H_2O \qquad (3)$$

The hypochlorite ion (ClO$^-$) will then react with the H$_2$S according to the following reactions:

$$H_2S + OCl^- \rightarrow SO + H_2O + Cl^- \qquad (4)$$
$$2OH^- + H_2S + 4OCl^- \rightarrow SO_4^{2-} + 4Cl^- + 2H_2O \qquad (5)$$

Thus, through electrolysis, the hydrogen sulfide is converted to non-toxic, non-corrosive and insoluble sulfur and to water-soluble non-toxic and unvaporizable sulfate ion.

The temperature at which the sour brine is electrolyzed in the cell is not critical and generally will vary from about 20° to about 45°C. The concentration of the hydrogen sulfide in the sour brine will vary over wide limits although generally it will be from about 2 to about 500 ppm.

As previously pointed out, this invention is not limited to the use of any particular type of hyprochlorite cell. The cell shown in FIG. 2 has been successfully employed in reducing the hydrogen sulfide content of sour brine. The body 61 of the cell was a 5½ inch I.D. steel pipe 120 inches in length capped at one end. This section of pipe constituted the cathode of the cell and was connected at 62 to the negative side of a D.C. power source 63 by conductor 62a. The positive side of this power source was connected through ammeter 64 to the positive connection 65 of the cell which was a cylindrical galvanized iron rod about ¾ inch by 18 inches installed in a longitudinal position along the centerline and in direct electrical contact with the anode 66. Ammeter 64 was connected to positive connection 65 by conductor 64b and to power source 63 by conductor 64c. Voltmeter 64a was connected between cell body 61 and 62 by conductor 62b and to the positive cell connection 65 by conductor 64e. Anode 66, which was a graphite rod (3 inches O.D. by 60 inches in length) mounted concentrically inside the cell body and extending about 4 inches beyond the end of cell body 61, was insulated from it by insulating supports 67. Insulating support 67a served to form a water-tight closure at the end of the cell between the anode 66 and the cell body 61. Sour brine is introduced into the cell via nonconducting feed line 68 and after passing through the concentric annular space between cell body 61 and anode 66 is removed from the cell via non-conducting line 69. Lines 68 and 69 were fabricated from polyvinylchloride tubing.

EXAMPLE I

Figure 2:
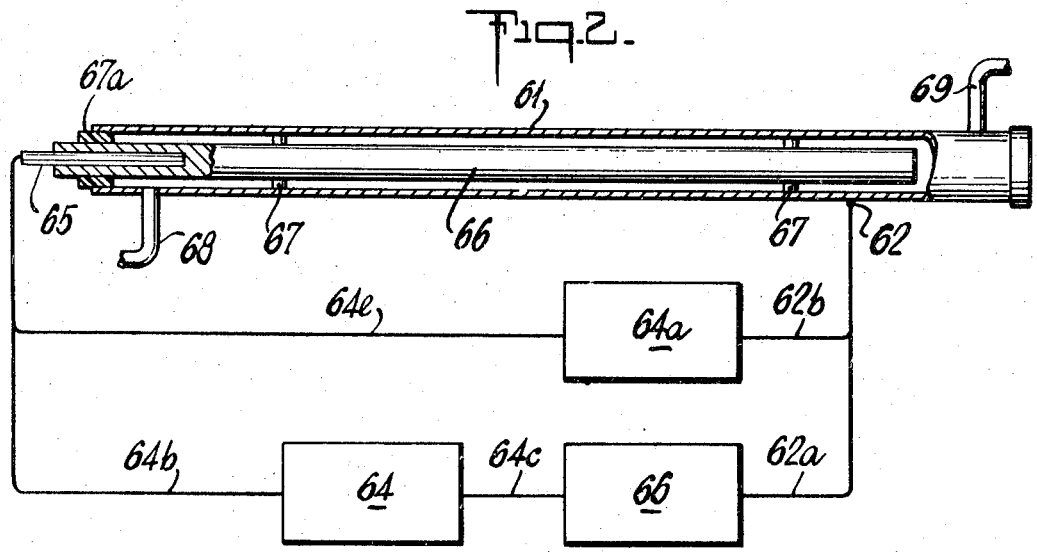

Using the cell of FIG. 2, sour brine (50,000–60,000 ppm of chloride ion and 79–84 ppm of hydrogen sulfide) was passed into the cell through feed line 68 and was removed from the cell through line 69. The water flow rate, amperage, and voltage drop between the electrodes were measured and, in addition, water samples were collected from the lines 68 and 69 and the pH and hydrogen sulfide concentrations determined. Pertinent data relating to these tests are set forth in Table 1 which follows:

TABLE 1

| Run No. | 1 | 2 | 3 |
|---|---|---|---|
| Amperage | 185 | 190 | 200 |
| Voltage | 4.2 | 4.2 | 4.4 |
| Water Rate (gal/min) | 5.44 | 7.29 | 10.2 |
| Before Electrolysis | | | |
| H$_2$S (ppm) | 84 | 83 | 79 |
| pH | 6.5 | 6.14 | 6.57 |
| Immediately after Discharge from Cell (1 minute) | | | |
| H$_2$S (ppm) | 74 | 67 | 66 |
| pH | 6.2 | 5.80 | 6.17 |
| 5 Minutes after Electrolysis | | | |
| H$_2$S (ppm) | 46 | 56 | 56 |
| pH | 6.37 | 5.90 | 6.25 |
| 30 Minutes after electrolysis | | | |
| H$_2$S (ppm) | 43 | 53 | 56 |
| pH | 6.37 | 5.86 | 6.23 |
| 1 Hour after Electrolysis | | | |
| H$_2$S (ppm) | 43 | 53 | 56 |
| pH | 6.37 | 5.86 | 6.23 |
| 2 Hours after Electrolysis | | | |
| H$_2$S (ppm) | 42 | 53 | 57 |
| pH | 6.37 | 5.86 | 6.23 |

These data indicate that a substantial reduction of the hydrogen sulfide in the sour brine can be accomplished with electrolysis. Further, the data indicate that the sodium hypochlorite generated in the cell continues to react with the hydrogen sulfide in the brine after the treated brine is removed from the cell.

EXAMPLE II

The cell shown in FIG. 2, previously employed in Example I, was modified so that the sour brine was introduced into the cell through four equally spaced ½ inch I.D. valved inlet lines fed from an inlet manifold rather than through the single inlet line previously utilized. This modification was made to prevent plugging experienced at the previously employed low flow rates and to reduce anode erosion. Sour brine was passed through the cell at rates of from 360 to 600 bpd (i.e., barrels per day) and the brine analyzed before and after treatment for hydrogen sulfide content. Pertinent details relating to these runs are set forth in Table 2 which follows:

TABLE 2

Weight of Anode (Saturated with Water - 33.75 lbs)

| Run No. | Rate, BPD | Inlet $H_2S$, ppm | Discharge $H_2S$, ppm | Removal $H_2S$, ppm | Amps | Volts |
|---|---|---|---|---|---|---|
| 1* | 600 | 94 | 76 | 18 | 315 | 5.7 |
| 2* | 600 | 98 | 67 | 31 | 325 | 5.8 |
| 3 | 600 | 98 | 75 | 23 | 320 | 5.8 |
| 4 | 600 | 97 | 80 | 17 | 315 | 5.8 |
| 5 | 400 | 97 | 72 | 25 | 320 | 5.9 |
| 6 | 400 | 96 | 72 | 24 | 315 | 5.8 |
| 7[1] | 300 | 103 | 68 | 35 | 300 | 6.0 |
| 8 | 400 | 108 | 88 | 20 | 200 | 4.4 |
| 9 | 400 | 110 | 83 | 27 | 190 | 4.4 |
| 10 | 400 | 96 | 78 | 18 | 180 | 4.4 |
| 11 | 360 | 94 | 76 | 18 | 190 | 4.6 |
| 12 | 600 | NR | NR | NR | 180 | 4.6 |
| 13 | 600 | 91 | 76 | 15 | 180 | 4.4 |
| 14 | 600 | NR | NR | NR | 180 | 4.6 |
| 15[2] | 600 | 95 | 82 | 13 | 170 | 4.6 |

*System down 16 hours due to power failure - down after approximately 6 hours of operation.
[1] Anode Weight - 33 lbs - after 152.5 hours on anode.
[2] Anode Weight - 33 lbs - after 325 hours on anode.

The above data reveal that in the single pass a substantial reduction of the hydrogen sulfide content of the sour brine can be accomplished. By treating the sour brine in cells operated in series any desired reduction in sulfide concentration can be satisfactorily achieved.

TABLE 3

| FLOW RATE (lbs/day) | NaOH ADDITION RATE (lbs/day) | INFLUENT $H_2S$ (ppm) | INFLUENT pH | TANK EFFLUENT $H_2S$ (ppm) | TANK EFFLUENT NaOCl (ppm) | TANK EFFLUENT pH | $H_2S$ REMOVED FROM STREAM (lbs/day) |
|---|---|---|---|---|---|---|---|
| 34,000 | 0 | 136 | 6.62 | 82 | 0 | 6.32 | 690 |
| 34,000 | 0 | 128 | 6.30 | 85 | 0 | 5.96 | 510 |
| 28,000 | 0 | 144 | 6.68 | 86 | 0 | 6.02 | 609 |
| 27,000 | 0 | 142 | 6.60 | 83 | 0 | 6.22 | 597 |
| 21,000 | 0 | 133 | 6.65 | 60 | 0 | 5.85 | 575 |
| 13,000 | 1000 | —* | — | 36 | 0 | 7.61 | 473 |
| 13,750 | 836 | —* | — | 48 | 0 | 6.73 | 437 |
| 14,000 | 657 | —* | — | 37 | 0 | 6.44 | 505 |
| 13,500 | 0 | 145 | 6.26 | 42 | 0 | 4.70 | 522 |
| 10,250 | 1100 | 136 | 6.42 | 0 | 13 | 7.73 | 523 |
| 10,000 | 623 | 131 | 6.35 | 0 | 10 | 6.60 | 491 |
| 10,750 | 110 | 137 | 6.36 | 12 | 0 | 3.43 | 503 |
| 7,000 | 1100 | 126 | 6.47 | 0 | 191 | 8.45 | 331 |
| 6,750 | 822 | 133 | 6.38 | 0 | 191 | 7.82 | 336 |
| 6,500 | 550 | 144 | 6.34 | 0 | 150 | 6.46 | 356 |
| 6,500 | 449 | 138 | 6.42 | 0 | 29 | 2.97 | 336 |

A variety of cells are described in the art for preparing sodium hypochlorite such as, for example, those shown in U.S. Pat. Nos. 1,996,769, 1,609,757, 1,609,758, 2,358,903 and 3,222,269. Preferably, the cell or cells employed will be of the enclosed type to prevent escape of hydrogen sulfide to the atmosphere prior to reaction with the formed sodium hypochlorite. A number of different cell arrangements can be utilized in this invention. For example, the sour brine can be sent through a bank of series operated cells and, if desired, the sodium hypochlorite can be prepared separately in cells employing make-up water to which sodium chloride has been added and the effluent therefrom having a relatively high concentration of sodium hypochlorite can be introduced into the sour brine stream where the hypochlorite reacts with and eliminates the hydrogen sulfide.

What is claimed is: claimed

1. A process for treating brine containing hydrogen sulfide which comprises subjecting the said brine to electrolysis to form sodium hypochlorite whereby reaction with the said hydrogen sulfide yields brine with a substantially reduced hydrogen sulfide content.

* * * * *

UNITED STATES PATENT OFFICE
CERTIFICATE OF CORRECTION

PATENT NO. : 3,847,764
DATED : November 12, 1974
INVENTOR(S) : Vernon H. Schievelbein, Leonard A. Shankle, Herbert N. Wade It is certified that error appears in the above-identified patent and that said Letters Patent are hereby corrected as shown below:

Column 1, line 27 "or" should read --of--.

Column 1, line 42 "is" second occurance should read --if--.

Column 3, line 33, in the formula "2oH'" should read --2OH⁻--.

Column 5, line 54, "2,358,903" should read --2,385,903--

Column 6, line 52, "What is claimed is:claimed" should read --What is claimed is:--.

Signed and Sealed this

Twenty-seventh Day of July 1976

[SEAL]

Attest:

RUTH C. MASON
Attesting Officer

C. MARSHALL DANN
Commissioner of Patents and Trademarks